(12) United States Patent
Oates

(10) Patent No.: US 6,190,281 B1
(45) Date of Patent: Feb. 20, 2001

(54) CASELESS INTERAXLE DIFFERENTIAL

(75) Inventor: Jack Darrin Oates, Fletcher, NC (US)

(73) Assignee: Meritor Heavy Vehicle Systems, LLC, Troy, MI (US)

(*) Notice: Under 35 U.S.C. 154(b), the term of this patent shall be extended for 0 days.

(21) Appl. No.: 09/393,248

(22) Filed: Sep. 10, 1999

(51) Int. Cl.$^7$ .................................................. F16H 48/08
(52) U.S. Cl. ............................................................. 475/230
(58) Field of Search ....................................... 475/230, 243

(56) References Cited

U.S. PATENT DOCUMENTS

| | | | |
|---|---|---|---|
| 1,185,174 | * | 5/1916 | Brush ..................................... 475/230 |
| 1,757,069 | * | 5/1930 | Weyman ................................. 475/243 |
| 2,355,144 | * | 8/1944 | Carlson .................................. 475/243 |
| 5,304,103 | * | 4/1994 | Schlosser .............................. 475/230 |
| 5,823,908 | * | 10/1998 | Stefanek ............................... 475/230 |
| 5,860,889 | * | 1/1999 | Schlosser et al. .................... 475/221 |

* cited by examiner

*Primary Examiner*—Sherry E. Estremsky
(74) *Attorney, Agent, or Firm*—Carlson, Gaskey & Olds

(57) ABSTRACT

An improved differential eliminates the need for a differential case. A cap is fixed to each of the spider legs, and traps the pinion gear. This arrangement reduces the weight and complexity of assembly for differentials. Moreover, the assembly increases the ease of oil access to bevel gears in the differential.

9 Claims, 1 Drawing Sheet

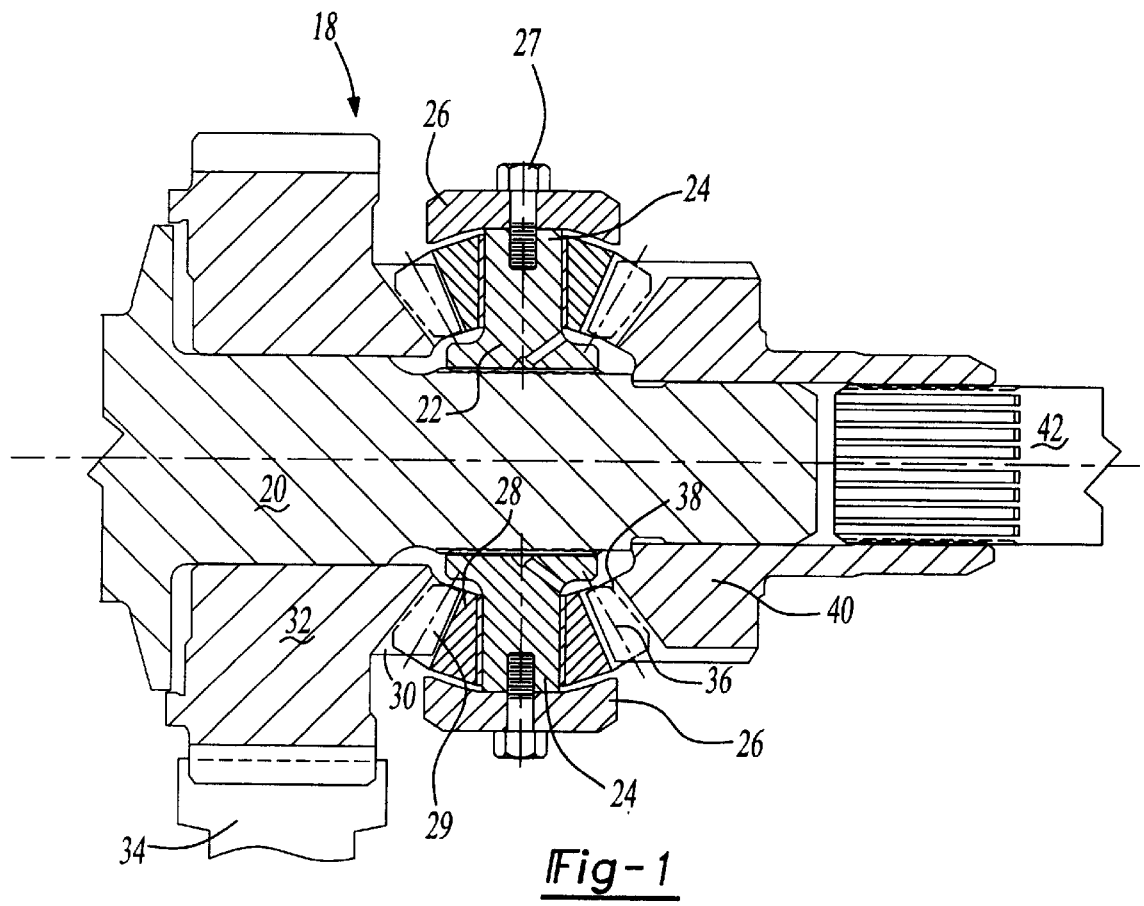
Fig-1
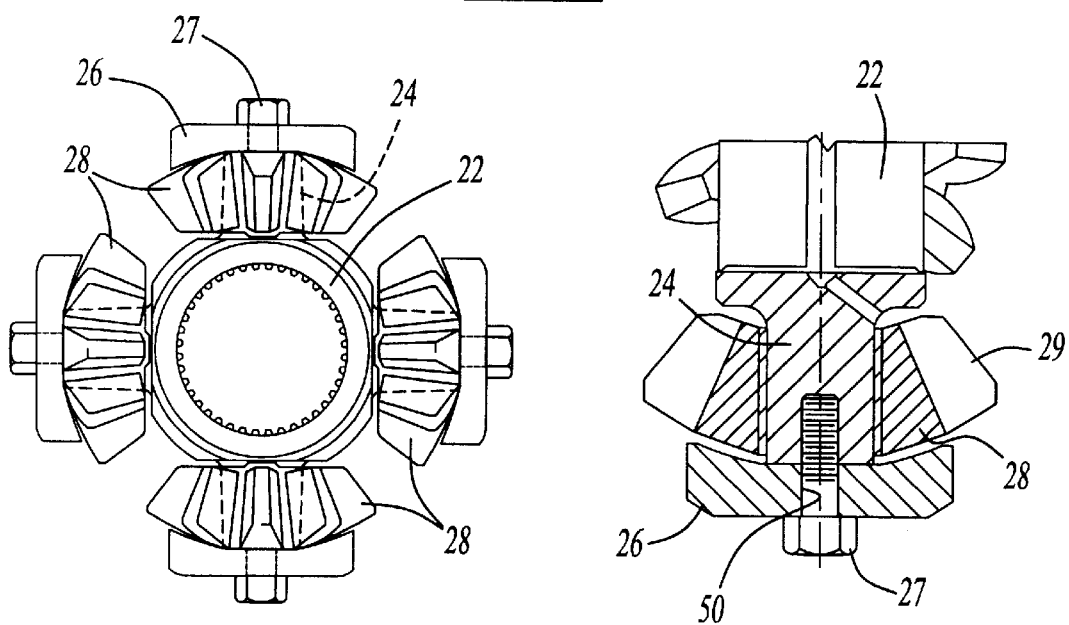
Fig-2
Fig-3

CASELESS INTERAXLE DIFFERENTIAL

BACKGROUND OF THE INVENTION

This invention relates to an improvement in interaxle differentials wherein the differential case is eliminated.

Differentials are utilized to take a single rotation input, and separate that single input into a pair of outputs. Typically, a differential spider hub is driven to rotate by the input shaft, and spider legs are fixed to rotate with the spider hub. Pinion gears are mounted on the spider legs, and are received along with the spider hub in a differential case which surrounds the spider legs and pinions. Since the gears are enclosed by the differential case, it is somewhat to ensure adequate lubricant to the gear faces. Side gears are in contact with each side of the pinions. The input shaft drives the spider hub, which in turn drives the spider legs, which cause the pinions to rotate with the legs about the axis of the input shaft. The pinions roll along the side gears, causing the two side gears to rotate. The two side gears are connected to output shafts. One shaft drives the rear drive axle and the other is connected to a gear connection to drive the front drive axle. Under some circumstances, the pinions turn on the spider legs.

Typically, the pinions forced outwardly by a reaction force from the side gear. The differential case provides a reaction surface resisting this force.

The above-described differentials are utilized in many distinct applications. It would be desirable to eliminate the differential case, as it is a complex part to make. Moreover, the differential case does make it somewhat difficult to provide adequate lubrication to the surfaces between pinions, the spider legs, and the side gears.

SUMMARY OF THE INVENTION

In a disclosed embodiment of this invention, the pinions are mounted to the spider legs by separate caps. The caps are secured to the spider legs with a securement device, such as a bolt. The caps provides a reaction surface for the pinions, and allow the elimination of the differential case.

This results in a lighter assembly, and one in which the pinion gears are exposed to oil more readily.

These and other features of the present invention can be best understood from the following specification and drawings.

BRIEF DESCRIPTION OF THE DRAWINGS

FIG. 1 is a cross-sectional view of an axle assembly incorporated in the present invention.

FIG. 2 is a detailed view of an interaxle differential incorporating the present invention.

FIG. 3 is an enlarged view of one spider leg assembly incorporating the present invention.

DETAILED DESCRIPTION OF A PREFERRED EMBODIMENT

Differential 18 is illustrated in FIG. 1 having an input shaft 20. The differential 18 is known as an interaxle differential, and serves to separate a drive input 20 to both the front and rear axles. Other differentials are utilized to split rotation between two sides of a vehicle, and the present invention may also have benefits in such differentials. Thus, the specific disclosure of a particular differential assembly should not be seen as limiting. Rather, the claims should be studied to determine the true scope of this invention.

The input shaft 20 drives a spider hub 22 having a plurality of spider legs 24 extending radially outwardly. A plurality of caps 26 are fixed to an outer end of the spider legs 24. Caps 26 are secured to the spider legs 24 by bolts 27.

Pinion gears 28 are received on the legs 24, and have gear teeth 29 engaging gear teeth 30 of a side gear 32. Side gear 32 drives a drop gear 34, which may be connected to the forward axle of a vehicle.

At the same time, teeth 36 from pinion gear 28 are driving teeth 38 associated with a second side gear 40. Second side gear 40 is fixed to rotate with a shaft 42, and is utilized to drive the rear axle of the vehicle.

The present invention utilizes the caps 26 and bolts 27 to eliminate the need for a differential case.

Typically, differentials of this sort will sometimes have a differential lock feature. Typically, the differential lock feature is utilized to directly connect one side gear to the differential case. However, since there is no differential case, another way of achieving this will be necessary for this invention. However, this is not a critical portion of this invention, and a worker of ordinary skill in the art would be able to develop several modifications wherein the differential lock can be achieved.

As shown in FIG. 2, there are a plurality of pinion gears 24 mounted at circumferentially spaced locations about the spider hub 22. Pinion gears 28 are each associated with a cap 26 bolted at 27 to the underlying spider leg 24.

As can be appreciated from FIG. 3, the spider 22 has the spider legs 24 with a bore 50 formed therein to receive the bolt 27. The cap secures the pinion on the spider leg, and resists a reaction force forcing the pinion outwardly away from the side gear teeth. As can be seen, the cap 26 has inwardly facing surface which is preferably curved to correspond to an outer face of the pinion 28. Also, as shown, it is preferred that the cap 26 has an outer periphery spaced inwardly from an outer periphery of teeth 29. This increases the oil access to the gears. As is also clear from the figures, a hub of the gear inward of the teeth extends radially outwardly for a first extent, and the cap 26 extends radially outwardly for a greater extent. Thus, the cap extends for a greater radially distance than the hub, but a lesser radially distance than the teeth. In this way, the cap does provide adequate support to the gear, while still allowing access for oil.

Further, a thrust washer may be placed between the cap and the pinion gear, and arranged on the spider leg. With the present invention, the cap itself could be surface treated such as by heat treating to obtain a specific hardness such that the cap could provide the thrust washer function. In the prior art, it would have been too expensive to heat treat the entire case. However, with the present invention, heat treating of the caps may be economically feasible.

The present invention reduces the weight and complexity of assembly for differential cases. Moreover, with the present invention, there is easier access for lubricant to the gears.

Although a preferred embodiment of this invention has been disclosed, a worker in this art would recognize that certain modifications come within the scope of this invention. For that reason, the following claims should be studied to determine the true scope and content of this invention.

What is claimed is:

1. A differential assembly comprising:

a central shaft rotatable about an axis;

a spider hub surrounding said central shaft, and having a plurality of spider legs extending radially outwardly at circumferentially spaced locations;

a pinion gear mounted on each of said spider legs, and rotatable about said spider legs;

a pair of side gears each having teeth engaged with said pinion gears at opposed sides of said spider hub; and each of said pinion gears and said spider legs being associated with a radially outer cap, said caps being secured to said spider legs, said caps not extending beyond an outer periphery of the teeth of an associated pinion gear, but said cap extending radially outwardly beyond an outer periphery of a hub radially inward of said teeth, and said cap having a radially inwardly facing surface which is curved corresponding to a curve of said hub of said pinion gear.

2. A differential as recited in claim 1, wherein said cap is bolted to said leg.

3. A differential as recited in claim 1, wherein said side gears are associated to drive front and rear axles of a vehicle.

4. A differential as recited in claim 3, wherein said central shaft is fixed to rotate with said spider, and is a drive input to said differential.

5. A differential as recited in claim 1, wherein there is a separate cap associated with each pinion gear.

6. A differential as recited in claim 1, wherein said cap is heat treated to have a specified hardness such that said cap can provide a thrust washer function to said pinion.

7. A differential comprising:

an input shaft extending along a rotational axis;

a spider hub fixed to rotate with said input shaft, and having a plurality of spider legs extending radially outwardly;

a plurality of pinion gears each associated with one of said spider legs;

a side gear positioned at each axial side of said spider, and having teeth engaged with said pinion gears, each of said side gears being mounted to drive inputs for a front and rear axle of a vehicle; and a cap fixed to each of said spider legs, said cap not extending beyond an outer periphery of said pinion gear, such that said cap is associated with only one of said pinion gears, said caps not extending beyond an outer periphery of the teeth of an associated pinion gear, but said extending radially outwardly beyond an outer periphery of a hub radially inward of said teeth, and said cap having a radially inwardly facing surface which is curved corresponding to a curve of said hub of said pinion gear.

8. A differential as recited in claim 7, wherein said cap is bolted to said leg.

9. A differential as recited in claim 7, wherein said caps are heat treated to have a required hardness.

* * * * *